(12) United States Patent
Panchapagesan et al.

(10) Patent No.: US 9,865,256 B2
(45) Date of Patent: Jan. 9, 2018

(54) SYSTEM AND METHOD FOR CALIBRATING A SPEECH RECOGNITION SYSTEM TO AN OPERATING ENVIRONMENT

(71) Applicant: Storz Endoskop Produktions GmbH, Tuttlingen (DE)

(72) Inventors: Sankaran Panchapagesan, Mountain View, CA (US); Matteo Contolini, Santa Barbara, CA (US); Ted Applebaum, Santa Barbara, CA (US)

(73) Assignee: Storz Endoskop Produktions GmbH, Tuttlingen (DE)

( * ) Notice: Subject to any disclaimer, the term of this patent is extended or adjusted under 35 U.S.C. 154(b) by 0 days.

(21) Appl. No.: 14/634,359

(22) Filed: Feb. 27, 2015

(65) Prior Publication Data
US 2016/0253994 A1    Sep. 1, 2016

(51) Int. Cl.
G10L 15/20 (2006.01)
G10L 21/0208 (2013.01)
G10L 15/22 (2006.01)
G10L 21/0316 (2013.01)
G06F 3/16 (2006.01)

(52) U.S. Cl.
CPC .......... G10L 15/22 (2013.01); G10L 21/0316 (2013.01); *G06F 3/167* (2013.01)

(58) Field of Classification Search
CPC ......... G10L 15/20; G10L 17/16; G06F 3/167; A61B 19/56
USPC ......... 704/216–219, 224, 237–240, 255–257
See application file for complete search history.

(56) References Cited

U.S. PATENT DOCUMENTS

| | | |
|---|---|---|
| 5,764,852 A | 6/1998 | Williams |
| 6,389,393 B1 | 5/2002 | Gong |
| 6,915,259 B2 | 7/2005 | Rigazio et al. |
| 6,988,070 B2 | 1/2006 | Kawasaki et al. |
| 7,413,565 B2 | 8/2008 | Wang et al. |
| 8,219,394 B2 | 7/2012 | Flaks et al. |
| 2004/0165735 A1 | 8/2004 | Opitz |

(Continued)

OTHER PUBLICATIONS

"Generalized Variable Parameter HMMs for Noise Robust Speech Recognition" Nina Cheng, et al., Institutes of Advanced Technology, Chinese Academy of Sciences The Chinese University of Hong Kong, Shatin, Hong Kong Cambridge University Engineering Dept, Trumpington St., Cambridge, CB2 1PZ U.K., 4 pages.

(Continued)

*Primary Examiner* — Marcellus Augustin
(74) *Attorney, Agent, or Firm* — Whitmyer IP Group LLC

(57) ABSTRACT

A voice controlled medical system with improved speech recognition includes a microphone in an operating environment and a medical device. The voice controlled medical system further includes a controller in communication with the microphone and the medical device that operates the medical device by executing audio commands received by the microphone. The voice controlled medical system further includes a calibration signal indicative of distortion in the operating environment which is generated by comparing an audio signal played in the operating environment with a sound signal received by the microphone. The controller uses the calibration signal to interpret audio commands received by the microphone.

23 Claims, 9 Drawing Sheets

(56) References Cited

U.S. PATENT DOCUMENTS

| | | | | |
|---|---|---|---|---|
| 2008/0280653 | A1* | 11/2008 | Ma | H04M 9/082 455/569.1 |
| 2011/0063429 | A1* | 3/2011 | Contolini | A61B 17/00 348/77 |
| 2012/0053941 | A1 | 3/2012 | Swick | |
| 2013/0030800 | A1* | 1/2013 | Tracey | G10L 21/003 704/219 |
| 2013/0144190 | A1* | 6/2013 | Bruce | A61B 5/4818 600/586 |
| 2013/0170666 | A1* | 7/2013 | Ng | H04R 29/006 381/92 |

OTHER PUBLICATIONS

"Hidden Markov model", Wikipedia contributors, Wikipedia, The Free Encyclopedia, http://en.wikipedia.org/wiki/Hidden_Markov_model, Date of last revision: Dec. 12, 2014, 10 pages.

Jean-Luc Gauvain and Chin-Hui, "Maximum A Posteriori Estimation for Multivariate Gaussian Mixture Observations of Markov Chains", IEEE Trans. Speech & Audio Processing, vol. 2, No. 2, Apr. 1994., 9 pages.

C. J. Leggetter and P. C. Woodland, "Maximum likelihood linear regression for speaker adaptation of continuous density hidden Markov models", Computer Speech & Language, vol. 9, Issue 2, Apr. 1995, pp. 171-185.

M.J.F. Gales, "Maximum Likelihood Linear Transformations for HMM-Based Speech Recognition", Computer Speech and Language, vol. 12, pp. 75-98, 1998. 20 pages.

"Mean and Variance Adaptation within the MLLR Framework", M.J.F. Gales & P.C. Woodland, Apr. 1996 Revised Aug. 23, 1996 Cambridge University Enginnering Department Trumpington Street Cambridge CB2 1PZ England, 27 pages.

"Speech recognition", Wikipedia contributors, Wikipedia, The Free Encyclopedia., http://en.wikipedia.org/wiki/Speech_recognition Date of last revision: Feb. 16, 2015, 14 pages.

The HTK Book, v.3.4., First published Dec. 1995, 368 pages, © Microsoft Corporation 1995-1999, © Cambridge University Engieering Department 2001-2006.

* cited by examiner

SYSTEM AND METHOD FOR CALIBRATING A SPEECH RECOGNITION SYSTEM TO AN OPERATING ENVIRONMENT

FIELD OF THE INVENTION

The systems and methods described herein generally relate to the field of remotely controlled digital operating rooms; and, more directly, to the field of such operating rooms using remote microphones in the operating room.

BACKGROUND OF THE INVENTION

Modern operating rooms for performing surgery have seen several advancements over the past two decades. In the late $20^{th}$ century, state-of-the-art operating rooms included several electronic surgical instruments (i.e. electrosurgical units, insufflators, endoscopes, etc.). These instruments were separately operated by the surgeon and members of the surgical team. The industry improved upon this type of operating room by integrating the various instruments into a unified system. With this configuration, the surgeon and/or members of the team use a central controller (or surgical control unit) to control all of the instruments through a single interface (often a graphical-user interface). Generally speaking, these central control units were built using modified personal computers and the operating rooms using them are commonly referred to as "digital operating rooms".

The establishment of the digital operating room paved the way for the voice controlled operating room. With this system, a member of the surgical team (usually the surgeon) wears a headset with a microphone. The surgeon issues spoken commands into the headset, these commands are sent to the central controller which controls the various instruments to perform desired tasks or make on-the-fly adjustments to operating parameters. The central controller operates software including a speech-to-text converter (i.e. speech recognition software) to interpret and execute the voice commands. Since computers often have difficulty understanding spoken language, typical systems include audible confirmation feedback to the surgical team, notifying them that a command has been understood and executed by the controller. Since sterility is critically important in all surgical procedures, this touch-free control system represented a significant advancement.

The voice-controlled digital operating room was further improved by the introduction of the wireless voice-control headset. This gave the surgeon greater mobility and eliminated the microphone cable as a possible source of contamination or nuisance for the surgeon. Voice controlled digital operating rooms with wireless headsets represent the modern state-of-the-art in the field.

Although this type of system has worked well for the convenience and efficacy of the surgical team and the maintenance of sterility, it has introduced certain heretofore unknown safety issues. One such safety issue is the problem of surgeons issuing commands into wireless headsets and input devices that are mated with a nearby room's surgical control unit. In that situation, a surgeon may attempt to control a surgical control unit present in the room they are occupying, only to inadvertently control another surgical control unit in a nearby room where an unrelated procedure is being performed. This problem is exacerbated by the fact that a surgeon may repeat commands in a vain attempt to operate the surgical control unit in the room they are occupying. This can result in injury to the patient and surgical team and/or damage to the equipment in the nearby room.

Moreover, a surgical team must keep track of the headset and ensure that the surgeon is wearing it prior to the procedure. Although they are less intrusive and more convenient than prior systems, the wireless headsets are still a source of potential contamination and nuisance for the surgeon.

The problems associated with wireless headset microphones can be eliminated by replacing them by ambient microphones located inside the operating room to receive the surgeon's commands. By using ambient microphones, the wireless headset is eliminated as a potential source of contamination. Furthermore, issuing commands to the wrong operating room control unit is impossible. However, the use of ambient microphones introduces new problems. Ambient microphone voice control systems use similar speech recognition software as headset voice control systems. Headsets receive relatively "clean" speech input with a high signal-to-noise ratio as a result of being very near the source of the speech commands. However, this advantage is not present with ambient microphones and the software that interprets speech commands is poorly adapted to deal with the additional background noise and reverberations present in the audio data gathered by ambient microphones.

One way to improve the voice control software's ability to selectively analyze speech commands is to calibrate the voice control system after the surgical system and ambient microphone are installed in the operating room. A modern speech recognition system is typically trained on several hundreds or even thousands of hours of speech data produced by a large number of speakers. Preferably, these speakers constitute a representative sample of the target users of the system. Such a speech recognition system will perform at its best when used in an environment that closely matches the noise conditions and type of microphone used for recording the training speech data. Most commonly, training speech data are recorded in relatively controlled and quiet environments, and using high quality close-talking microphones. When a speech recognition system trained on this data is used in a noisy operating room and with a far-field microphone, the accuracy of recognition tends to degrade dramatically. Theoretically, such degradation could be corrected by recording the training data in a noisy operating room and with the same far-field microphone. However, each operating room has its own noise characteristics and specified installation location for the far-field microphone, which means that in order to achieve the best possible performance with such a strategy, the speech data would have to be recorded in every individual room. Obviously, this would be extremely costly and impractical. It is desirable then to develop a technique that makes it possible to take a generic speech recognition system, trained on standard speech data (quiet environment, close-talking microphone), and quickly adapt it to the new noisy environment of a particular operating room and far-field microphone combination. The word "quickly" is used here to mean that only a little amount of new audio data is needed to be recorded in the target environment.

Using a technician issuing commands in the operating environment to calibrate the system is currently not a viable alternative because current calibration algorithms such as maximum-likelihood linear regression (MLLR) and maximum a posteriori estimation (MAP) would adapt the voice interpreting system to both the technician and the operating environment, substantially degrading performance for other users (i.e. the intended users of the system such as the surgeons and nurses).

There remains a need in the art for calibration system for an ambient microphone voice controlled surgical system that calibrates the voice control system using limited audio data collected in the operating environment. The calibration system would be capable of calibrating the control system to the unique properties of an operating environment while preventing unique characteristics of a technician's voice or other audio sources used for calibration from affecting the final calibration.

SUMMARY OF THE INVENTION

In one embodiment, a voice controlled medical system with improved speech recognition includes at least one microphone in an operating environment and a medical device. The voice controlled medical system further includes a controller in communication with the microphone and the medical device that operates the medical device by executing audio commands received by the microphone. The voice controlled medical system further includes a calibration signal indicative of distortion in the operating environment which is generated by comparing an audio signal played in the operating environment with a sound signal received by the microphone. The controller uses the calibration signal to interpret audio commands received by the microphone.

In some embodiments, the audio signal comprises a recording of at least one human voice. In some embodiments, the audio signal comprises a recording of at least two human voices. In some embodiments, the audio signal comprises a set of sounds pre-selected to give the best performance for calibrating the controller. In some embodiments, the controller interprets audio commands using a hidden Markov model. In some embodiments, the at least one microphone is a microphone array.

In one embodiment, a voice controlled medical system with improved speech recognition includes a first and a second microphone in an operating environment. The second microphone is nearer to a source of sound in the operating environment than the first microphone. The system further includes a medical device and a controller in communication with the first microphone and the medical device that operates the medical device by executing commands received by the first microphone. The system further includes a calibration signal generated by comparing a sound received by the first microphone and the second microphone. The controller uses the calibration signal to interpret audio commands received by the first microphone.

In some embodiments, the controller interprets audio commands using a hidden Markov model. In some embodiments, the source moves within the operating environment while the sound is received by the first microphone and the second microphone. In some embodiments, the system further includes voice interpreting data and a source calibration signal generated by comparing a sound received by the second microphone and the voice interpreting data; and the calibration signal is generated by comparing the source calibration signal to the sound received by the first microphone. In some embodiments, the calibration signal is generated using a Mean MLLR algorithm. In some embodiments, the calibration signal is generated using a Constrained MLLR algorithm.

In one embodiment, a method of calibrating a speech recognition system in a voice controlled medical system includes playing an audio sample in an operating environment. The method further includes recording the audio sample using at least one microphone in an operating environment. The method further includes comparing the audio sample to the recording by the microphone. The method further includes generating a calibration signal based on the comparison performed.

In some embodiments, the audio sample comprises a recording of at least one human voice. In some embodiments, the audio sample comprises a recording of at least two human voices. In some embodiments, the audio sample comprises a set of sounds pre-selected to give the best performance for calibrating the speech recognition system. In some embodiments, the at least one microphone is a microphone array.

In one embodiment, a method of calibrating a speech recognition system in a voice controlled medical system includes recording a sound in an operating environment using a first microphone and a second microphone nearer to a source of the sound than the first microphone. The method further includes comparing the recording by the first microphone and the second microphone. The method further includes generating a calibration signal based on the comparison performed.

In some embodiments, the method further includes moving the source of the sound within the operating environment while recording the sound. In some embodiments, the method further includes generating a source calibration signal by comparing the recording by the second microphone to voice interpreting data, and comparing the source calibration signal to the recording by the first microphone; and generating a calibration signal based on the comparison between the source calibration signal and the recording by the first microphone. In some embodiments, the calibration signal is generated using a Mean MLLR algorithm. In some embodiments, the calibration signal is generated using a Constrained MLLR algorithm.

DETAILED DESCRIPTION OF THE INVENTION

Figure 1A:
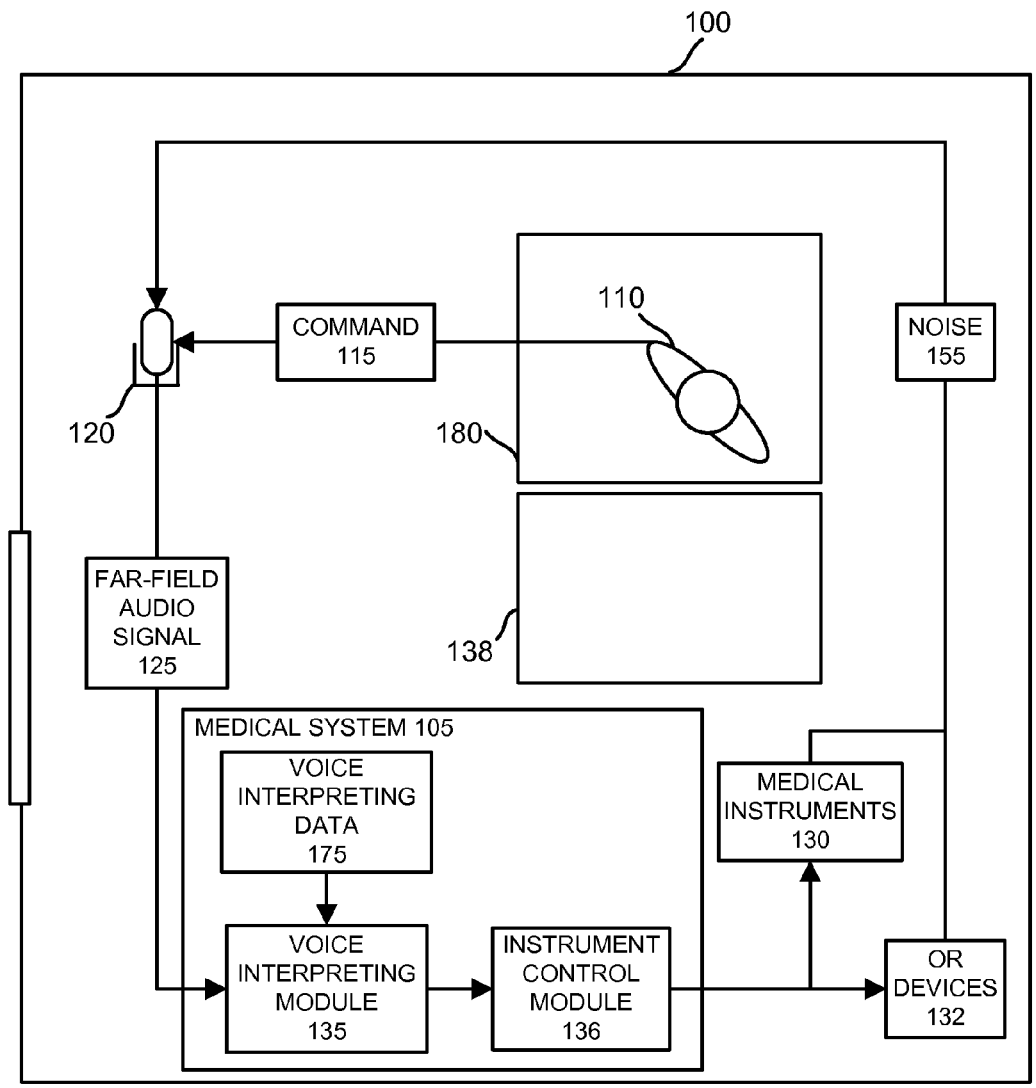
FIG. 1A is a block diagram of one embodiment of the voice controlled medical system in normal operation in an operating environment.

FIG. 1A shows a voice controlled medical system 105 in normal operation in an operating environment 100. During a medical procedure, operator 110 issues commands 115 which are received by far-field microphone 120. In some embodiments far-field microphone 120 is a microphone array. Commands 115 are transmitted as far-field audio signal 125 to voice controlled medical system 105 to control medical instruments 130. Voice controlled medical system 105 comprises voice interpreting module 135 that interprets commands 115 from far-field audio signal 125 using voice interpreting data 175 (also referred to as "the acoustic model" by those skilled in the art). Voice interpreting module 135 then sends signals to instrument control module 136 which sends instructions to medical instruments 130 and operating room (OR) devices 132 (such as lights, A/V systems, phones, etc.). Medical instruments 130 are typically connected to a patient on surgical table 138.

Voice controlled medical system 105 comprises voice interpreting module 135 which interprets commands 115 from operator 110. Voice interpreting module 135 uses speech recognition algorithms, such as hidden Markov model (HMM) analysis, to interpret commands 115. Far-field audio signal 125 comprises a sequence of sounds. Voice interpreting module 135 identifies the sequence to determine the words contained in fair-field audio signal 125. In embodiments that perform HMM analysis, voice interpreting module 135 comprises voice interpreting data 175 and a look-up table of sounds patterns and corresponding words (e.g., phonetic dictionary). Voice interpreting data 175 are typically developed prior to installation in operating environment 100 using clean speech samples.

However, voice interpreting module 135 may have reduced performance in environments where operators 110 with unusual voices or environmental noise 155 is introduced into the signal 125. Different operators 110 have different voice tonality and speech patterns, and will produce commands 115 that do not perfectly match voice interpreting data 175. Far-field audio signal 125 will be further corrupted by noise 155 generated by medical instruments 130, OR devices 132, or other devices or people in operating environment 100. Furthermore, every operating environment 100 will have unique acoustic properties, such as sound reflection and absorption properties, reverberation, and echoes. These acoustic properties will further corrupt far-field audio signal 125. Therefore, voice interpreting module 135 must be calibrated to maximize the command recognition performance of voice-controlled medical system 105. Ideally, voice interpreting module 135 would be calibrated to the environment, and not to an individual operator 110, so that it can perform well with the widest variety of operators 110. Calibration is typically performed when medical system 105 is installed in operating environment 100.

The goal of calibrating voice interpreting module 135 is to compensate for noise 155 and the distortions discussed above. A successful calibration will enable voice interpreting module 135 to correctly interpret a larger percentage of commands 115 from each individual operator 110 in a given environment 100. Furthermore, a successful calibration will enable voice interpreting module 135 to correctly interpret commands 115 from a greater number of operators 110, including operators 110 with strong accents or otherwise atypical voices or speech patterns.

Figure 1B:
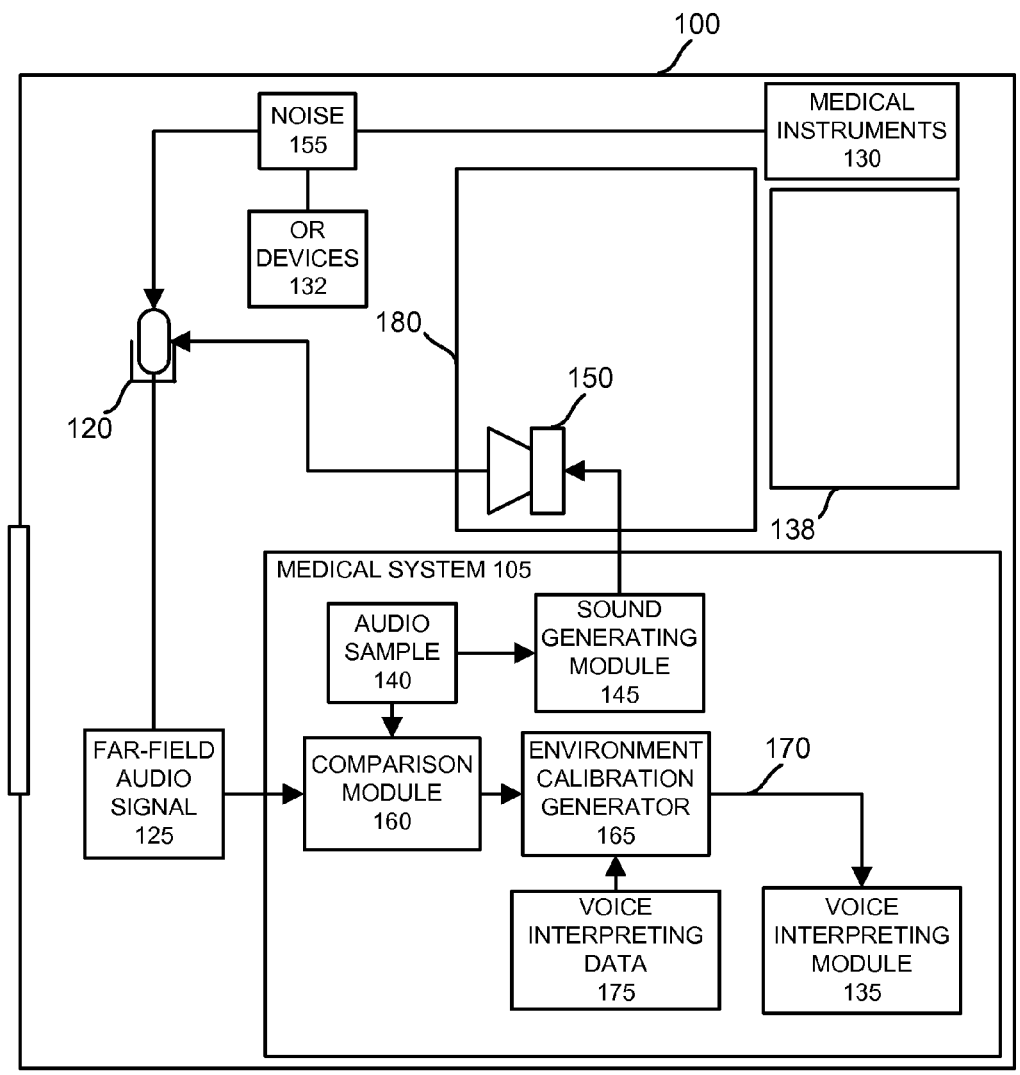
FIG. 1B is a block diagram of one embodiment of the voice controlled medical system being calibrated in an operating environment.

FIG. 1B shows one embodiment of calibration being performed on medical system 105. In this embodiment, calibration is achieved by playing audio sample 140 in operating environment 100 using sound generating module 145 and speaker 150. The audio sample 140 may be generated as needed (e.g., by computer or by user) or may be generated in advance and stored for later use by the system (e.g., in a storage such as a database). In this embodiment, speaker 150 and operator 110 are located within a command area 180 where speech control is expected or desired. Audio sample 140 is received by far-field microphone 120. However, far-field microphone 120 also receives noise 155 from operating environment 100. Furthermore, any sound travelling through operating environment 100 (including audio sample 140) will be distorted by the fundamental acoustic (reflective/absorptive) properties of operating environment 100. Thus, the audio signal 125 that far-field microphone 120 transmits will not be identical to audio sample 140. Far-field audio signal 125 will comprise a distorted and/or reverberated version of audio sample 140 combined with noise 155.

Far-field audio signal 125 from far-field microphone 120 is received by comparison module 160. Comparison module 160 compares far-field audio signal 125 with audio sample 140. Comparison module 160 thereby estimates the noise 155 and reverberation properties of operating environment 100. Environment calibration generator 165 uses data from the comparison performed by comparison module 160 to develop an environment transform (calibration signal 170) for operating environment 100. The environment transform is then used by voice interpreting module 135 to interpret commands 115 in far-field audio signal 125.

Audio sample 140 may be speech from a single pre-selected speaker (e.g. a training speaker whose data is matched to voice interpreting data 175). In some embodiments, audio sample 140 comprises utterances from a variety of speakers, pre-determined to give the best performance for calibration. In some embodiments, audio sample 140 comprises a sound or set of sounds that are not human voices.

The calibration shown in FIG. 1B calibrates the voice interpreting module 135 to operating environment 100, and not to individual operators 110, because the differences between audio sample 140 and audio signal 125 are caused by noise 155 and acoustic properties of operating environment 100, rather than an operator 110 (or technician installing medical system 105).

Figure 2:
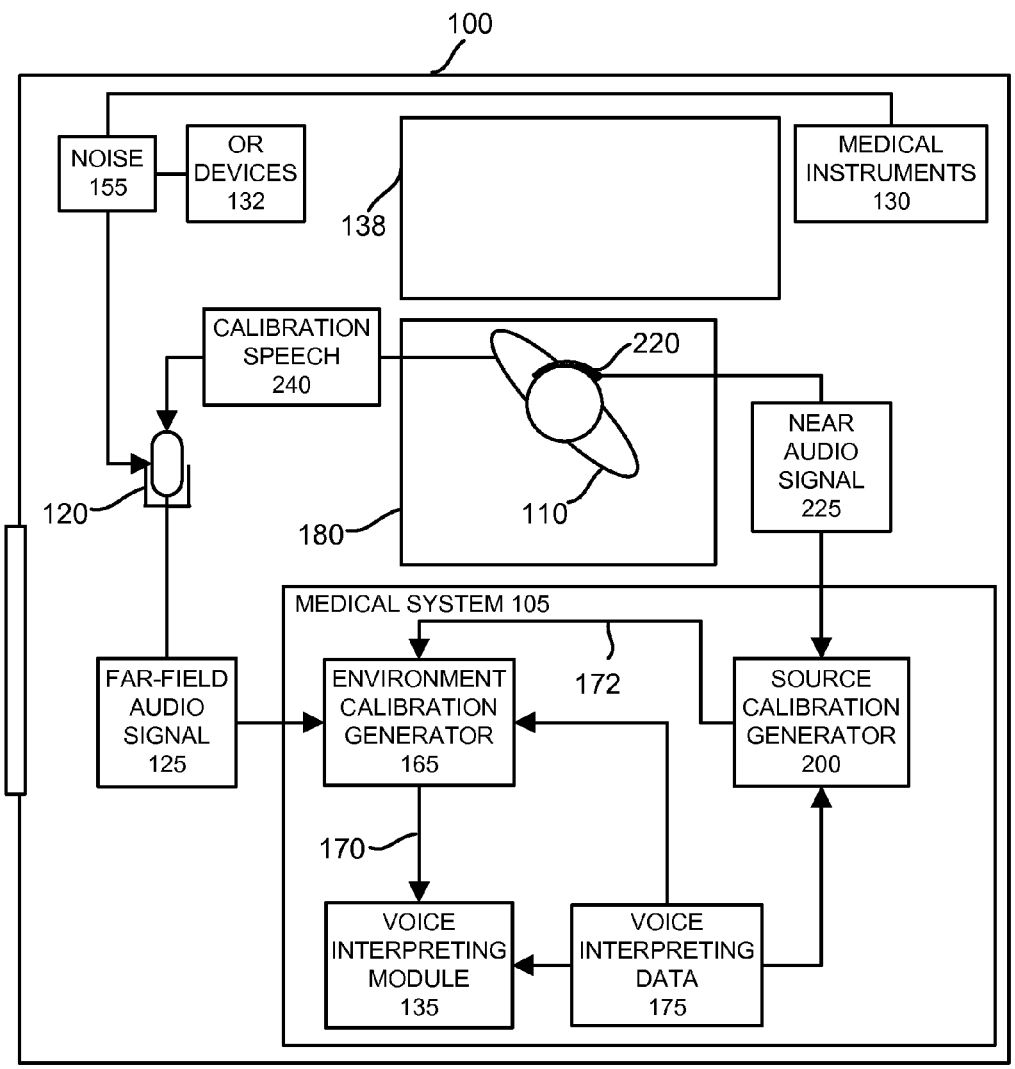
FIG. 2 is a block diagram of one embodiment of the voice controlled medical system being calibrated in an operating environment.

FIG. 2 shows one embodiment of calibration being performed on medical system 105. In this embodiment, operator 110 is using a near microphone 220 such as a wireless voice control headset. Near microphone 220 and far-field microphone 120 both receive calibration speech 240. Near microphone 220 produces near audio signal 225 based primarily on calibration speech 240. Thus, near audio signal 225 is a relatively clean signal, having a high signal to noise ratio and not comprising much noise 155 or distortion from operating environment 100. By contrast, far-field microphone 120 receives a significant noise 155 and distortion from operating environment 100 and will integrate this into far-field audio signal 125, which will have a lower signal to noise ratio than near audio signal 225. In some embodiments far-field microphone 120 is a microphone array.

In order to calibrate voice interpreting module 135, medical system 105 uses both far-field audio signal 125 and near audio signal 225. Near audio signal 225 is used by source calibration generator 200 to generate a speaker transform (source calibration signal 172). Source calibration signal 172 is generated based on the differences between near audio signal 225 and voice interpreting data 175. Source calibration signal 172 may be computed using a maximum-likelihood linear regression (MLLR) between near audio signal 225 and voice interpreting data 175. The speaker transform determines the calibration needed to adapt voice interpreting data 175 to the idiosyncrasies of the speech generated by individual operator 110 (i.e. the specific technician calibrating medical system 105). In other words, source calibration signal 172 determines the contribution of the unique properties of the speech of operator 110, and the effects those properties have on the ability of voice interpreting module 135 to interpret commands 115 from individual operator 110.

Once source calibration signal 172 has been determined by source calibration generator 200, the effects on the audio input attributable to individual operator 110 can be isolated and eliminated from the final calibration (calibration signal 170). This is desirable because voice interpreting module 135 should be adapted to operating environment 100, rather than individual operators 110 so that medical system 105 will have optimal speech recognition performance with the widest variety of operators 110. Thus, environment calibration generator 165 uses far-field audio signal 125 and source calibration signal 172 generated by source calibration generator 200 to determine the impulse response caused by operating environment 100, and generates calibration signal 170 on that basis.

In some embodiments, source calibration generator 200 uses maximum-likelihood linear regression (MLLR) to generate the source calibration signal 172 that adapts operator-independent voice interpreting data 175 in to operator 110. Environment calibration generator 165 may also use MLLR to generate the calibration signal 170 that adapts voice interpreting data 175 to operating environment 100.

Operator 110 may move around operating environment 100 while producing calibration speech 240. For example, operator 110 may move around command area 180 where speech control is expected or desired. Command area 180 is in the vicinity of surgical table 138 in this embodiment, because operator 110 is a surgeon performing a procedure on a patient in surgical table 138 in several embodiments. Voice calibration will be tailored toward optimal performance when receiving commands from command area 180 because it is expected that operator 180 will perform medical procedures in command area 180 while operating medical instruments 130 using voice commands 115.

If medical instruments 130 or other devices that produce noise 155 are expected to operate during normal operational use, they may be switched on during calibration. Thus, environment calibration generator 165 can account for these noises when generating the environment transform and teach voice interpreting module 135 to ignore these noises 155. This will improve the performance of voice interpreting module 135 when those medical instruments 130, OR devices 132, or other devices turn on during operational use of medical system 105. Moreover, calibration can be done dynamically so that new noise 155 generating devices 130, 132 can be brought into operating environment 100. Devices 130, 132 with known noise 155 generating properties can be pre-compensated for in the calibration without being physically present during calibration in operating environment 100.

Surgeon's assistants, nurses, or other members of the surgical team may also issue commands 115 to medical instruments 130 as needed. Voice interpreting module 135 has improved performance interpreting and executing commands 115 from multiple operators 110 due to the speaker-independent calibration described herein. Moreover, voice interpreting module 135 may be able to distinguish between different operators 110 and selectively execute commands depending on the identity of operator 110. This would prevent accidental medical instrument control by surgeon's assistants or the system attempting to execute conflicting commands form multiple operators 110.

Figure 3:
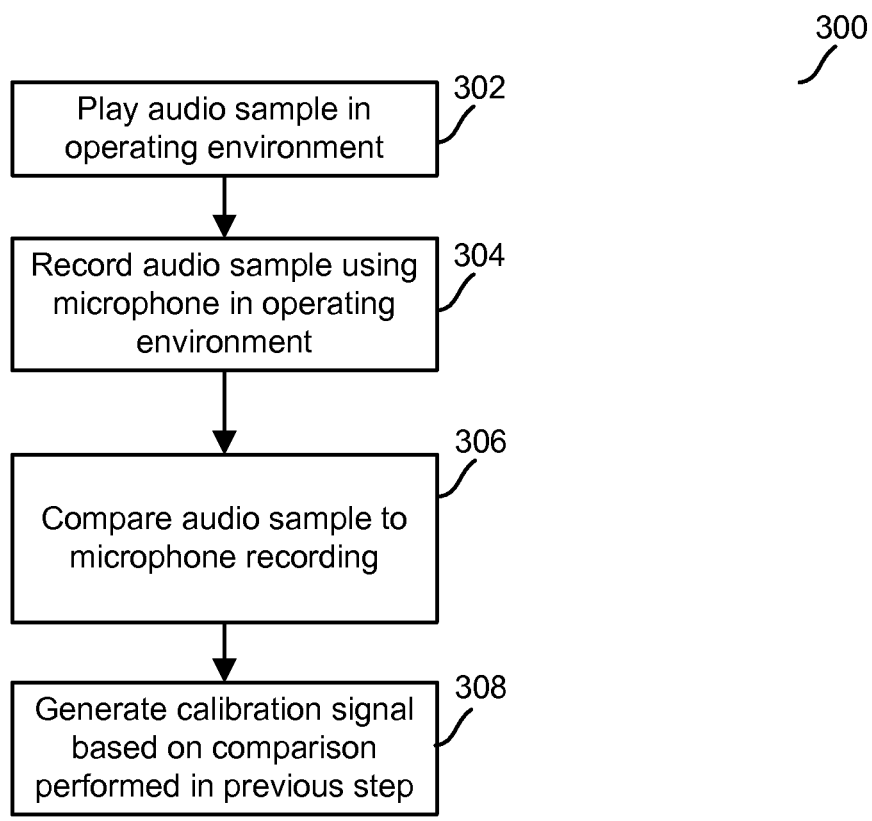
FIG. 3 is a flow chart of one embodiment of the method of calibrating a speech recognition system in a voice controlled medical system.

FIG. 3 shows a method of calibrating a speech recognition system in a voice controlled medical system according to one embodiment (300). The method 300 includes playing an audio sample in an operating environment (302). The method 300 further includes recording the audio sample using a microphone in an operating environment (304). The method 300 further includes comparing the audio sample to the recording by the microphone (306). The method 300 further includes generating a calibration signal based on the comparison performed (308).

Figure 4:
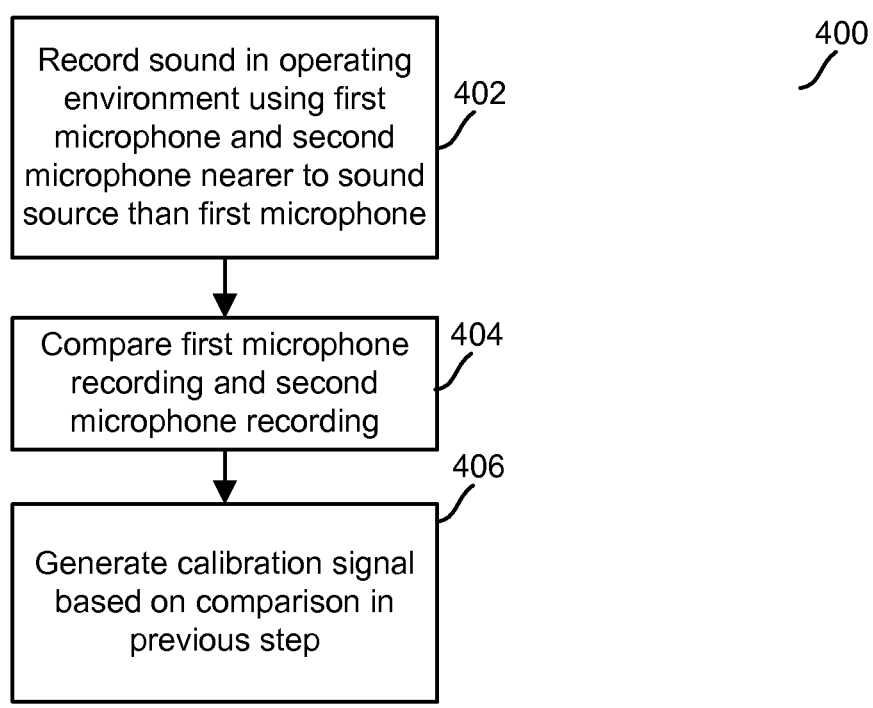
FIG. 4 is a flow chart of one embodiment of the method of calibrating a speech recognition system in a voice controlled medical system.

FIG. 4 shows a method of calibrating a speech recognition system in a voice controlled medical system according to one embodiment (400). The method 400 includes recording a sound in an operating environment using a first microphone and a second microphone nearer to a source of the sound than the first microphone (402). The method 400 further includes comparing the recording by the first microphone and the second microphone (404). The method further includes generating a calibration signal based on the comparison performed (406).

Figure 5:
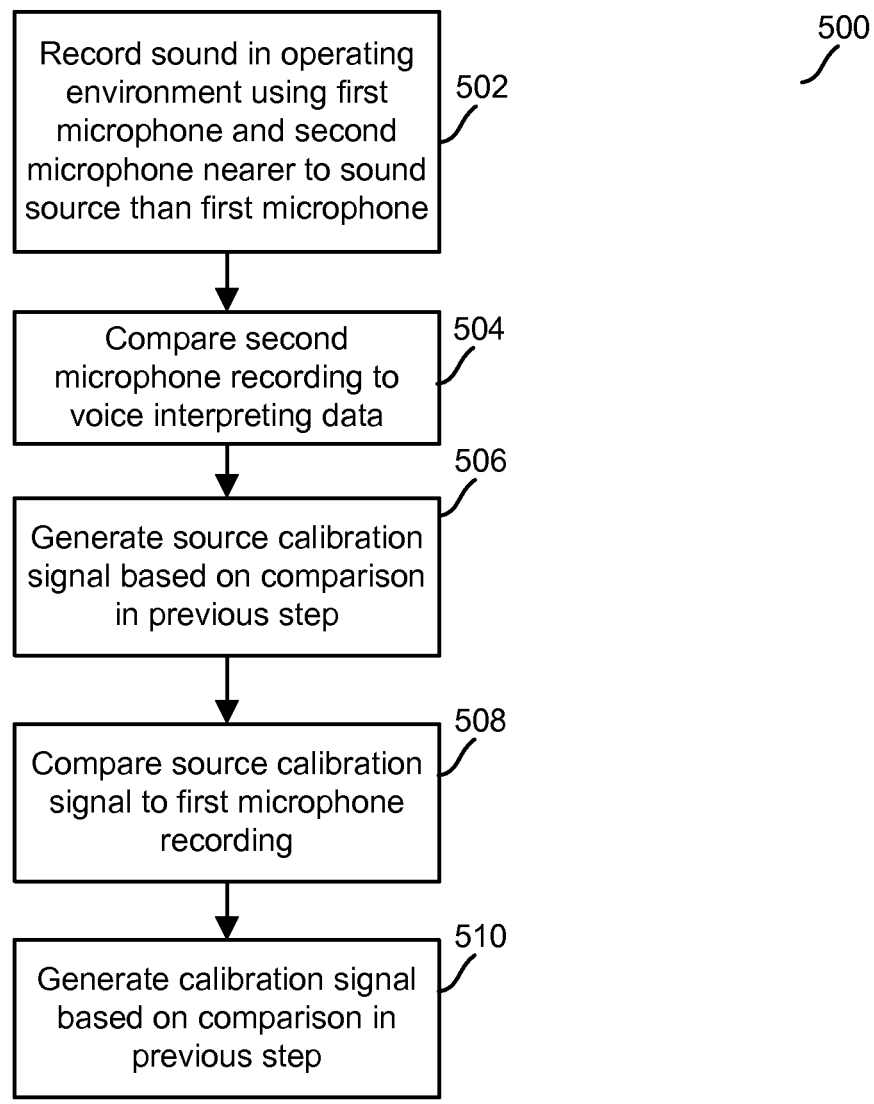
FIG. 5 is a flow chart of one embodiment of the method of calibrating a speech recognition system in a voice controlled medical system.

FIG. 5 shows a method of calibrating a speech recognition system in a voice controlled medical system according to one embodiment (500). The method 500 includes recording a sound in an operating environment using a first microphone and a second microphone nearer to a source of the sound than the first microphone (502). The method 500 further includes comparing the recording by the second microphone to voice interpreting data (504). The method further includes generating a source calibration signal based on the comparison in the previous step (506). The method further includes comparing the source calibration signal to the recording by the first microphone (508). The method further includes generating a calibration signal based on the comparison performed in the previous step (510).

Figure 6:
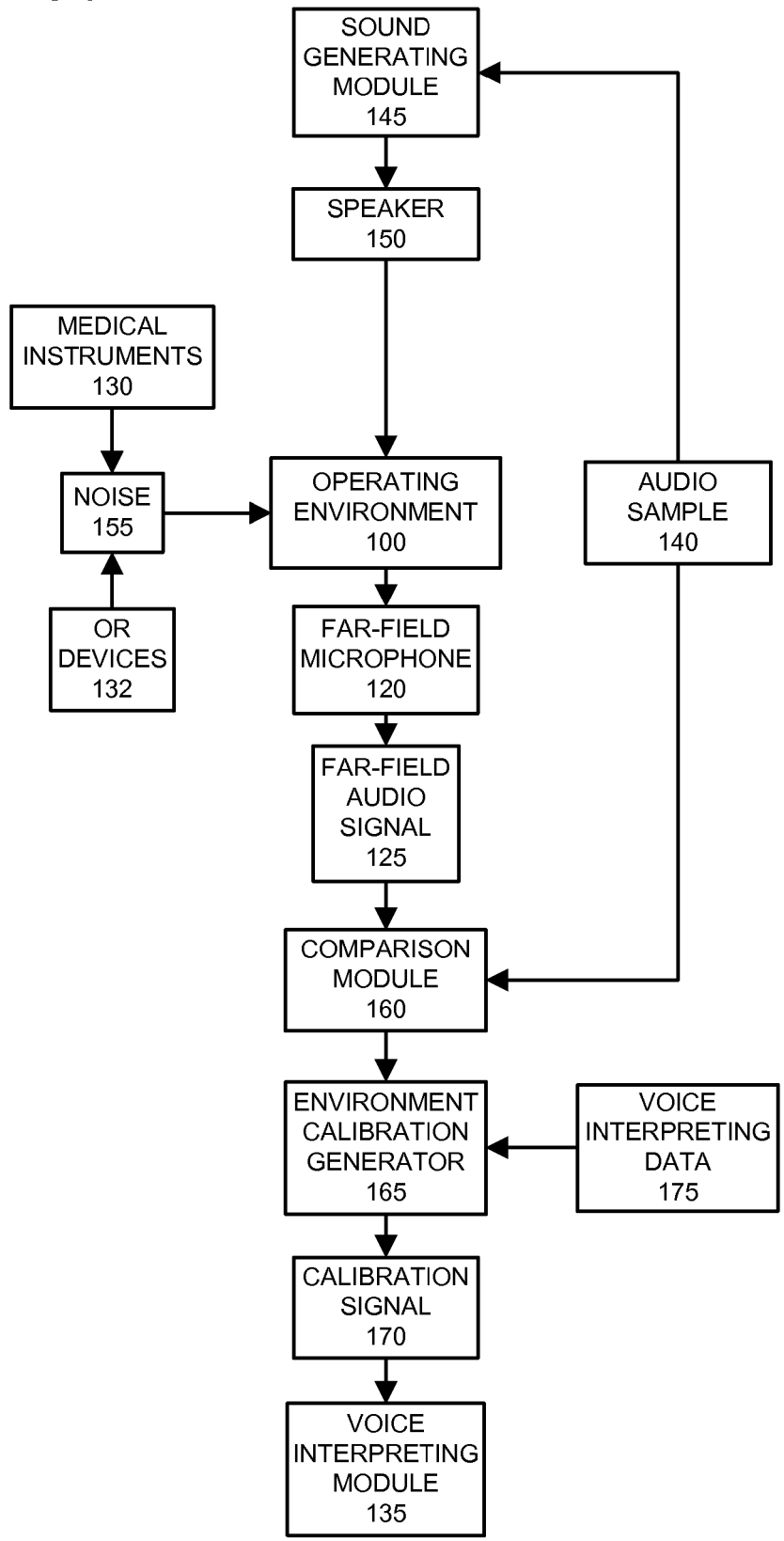
FIG. 6 is a block diagram of one embodiment of the voice controlled medical system being calibrated.

FIG. 6 shows one embodiment of a voice-controlled medical system 105 being calibrated. Calibration is achieved by playing audio sample 140 in operating environment 100 using sound generating module 145 and speaker 150. Audio sample 140 is received by far-field microphone 120. However, far-field microphone 120 also receives noise 155 from operating environment 100. Furthermore, any sound travelling through operating environment 100 (including audio sample 140) will be distorted by the fundamental acoustic (reverberative) properties of operating environment 100. Thus, the far-field audio signal 125 that far-field microphone 120 transmits will not be identical to audio sample 140. Far-field audio signal 125 will comprise a distorted and/or delayed version of audio sample 140 combined with noise 155.

Far-field audio signal 125 from far-field microphone 120 is received by comparison module 160. Comparison module 160 compares far-field audio signal 125 with audio sample 140. Comparison module 160 thereby determines the noise 155 and deformation/reflection properties of operating environment 100. Environment calibration generator 165 uses data from the comparison performed by comparison module 160 to develop an environment transform (calibration signal 170) for operating environment 100. The environment transform is then used by voice interpreting module 135 to interpret commands 115 in far-field audio signal 125.

The system shown in FIG. 6 calibrates the voice interpreting module 135 to operating environment 100, and not to individual operators 110, because the differences between audio sample 140 and audio signal 125 are caused by noise 155 and acoustic properties of operating environment 100, rather than an operator 110 (or technician installing medical system 105).

Figure 7:
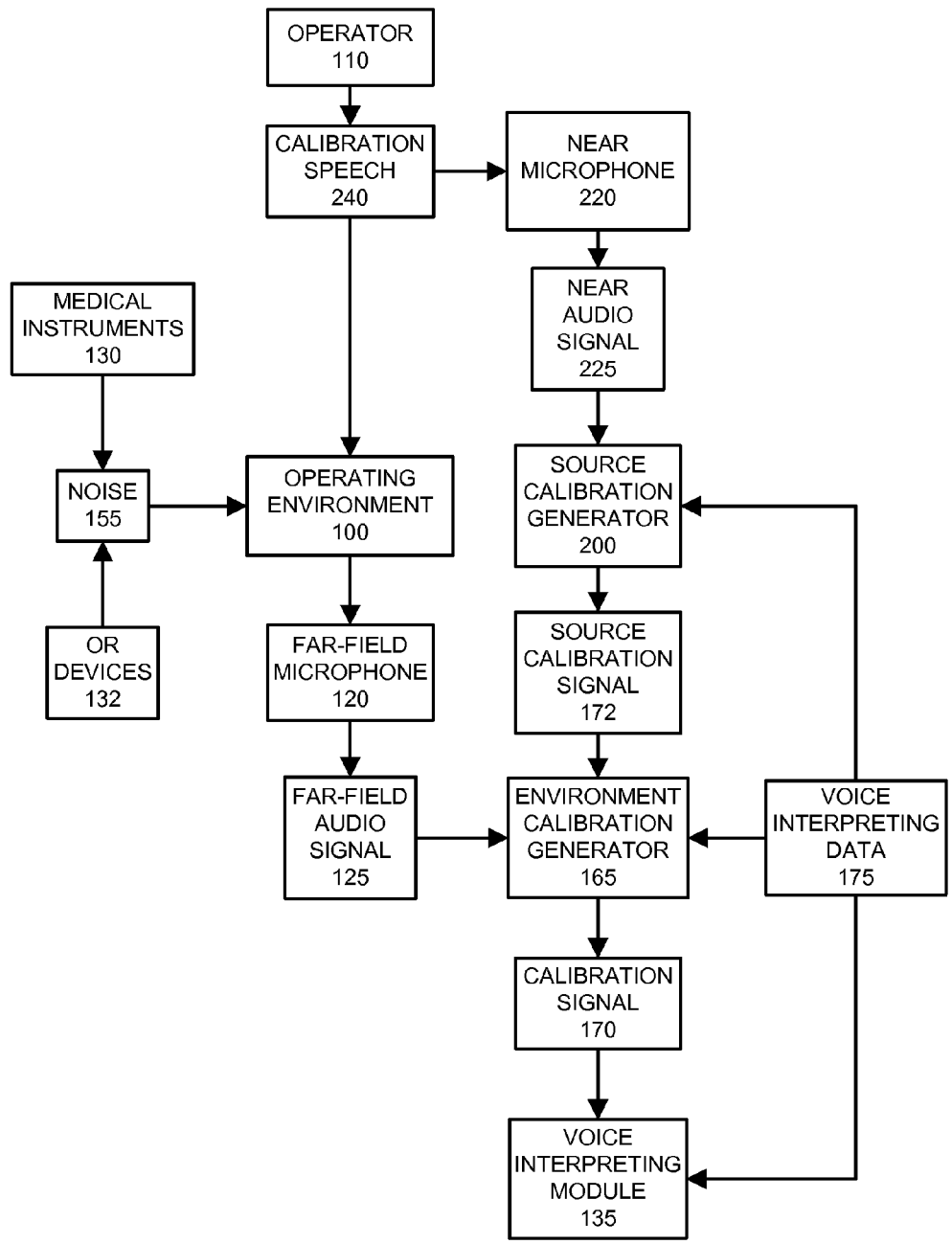
FIG. 7 is a block diagram of one embodiment of the voice controlled medical system being calibrated.

FIG. 7 shows one embodiment of a voice-controlled medical system 105 being calibrated. In this embodiment, operator 110 is using a near microphone 220 such as a wireless voice control headset. Near microphone 220 and far-field microphone 120 both receive calibration speech 240. However, calibration speech 240 is distorted by operating environment 100 before it is received by far-field microphone 120.

Near microphone 220 produces near audio signal 225 based primarily on calibration speech 240. Thus, near audio signal 225 is a relatively clean signal, having a high signal to noise ratio and not comprising much noise 155 (such as from medical instruments 130) or distortion from operating environment 100. By contrast, far-field microphone 120 receives a significant noise 155 and distortion as it is transferred through operating environment 100 and will integrate this into far-field audio signal 125, which will have a lower signal to noise ratio than near audio signal 225.

In order to calibrate voice interpreting module 135, medical system 105 uses both far-field audio signal 125 and near audio signal 225. Near audio signal 225 is used by source calibration generator 200 to generate a speaker transform (source calibration signal 172). Source calibration signal 172 is generated based on the near audio signal 225 and voice interpreting data 175, which may be computed using a maximum-likelihood linear regression (MLLR). Source calibration signal 172 may be computed using a maximum-likelihood linear regression (MLLR) between near audio signal 225 and voice interpreting data 175. The speaker transform determines the calibration needed to adapt voice interpreting data 175 to the idiosyncrasies of the speech generated by individual operator 110 (i.e. the specific technician calibrating medical system 105). In other words, source calibration signal 172 determines the contribution of the unique properties of the speech of operator 110, and the effects those properties have on the ability of voice interpreting module 135 to interpret commands 115 from individual operator 110.

Once source calibration signal 172 has been determined by source calibration generator 200, the effects on the audio input attributable to individual operator 110 can be isolated and eliminated from the final calibration (calibration signal 170). This is desirable because voice interpreting module 135 should be adapted to operating environment 100, rather than individual operators 110 so that medical system 105 will have optimal speech recognition performance with the widest variety of operators 110. Thus, environment calibration generator 165 uses far-field audio signal 125 and source calibration signal 172 generated by source calibration generator 200 to determine the distortion caused by operating environment 100, and generates calibration signal 170 on that basis.

Source calibration generator 200 and environment calibration generator 165 can use several algorithms to generate environment calibration signal 170. Two such algorithms are the Mean MLLR and the Constrained MLLR. These algorithms are defined in the following paragraphs.

In the following equations, $\{x_t^{ct}\}$ and $\{x_t^{ff}\}$ (t indicating time/frame index) are speech feature vector sequences calculated from the near audio signal 225 (from near microphone 220) and far-field audio signal 125 (from far-field microphone 120).

The source calibration signal 172 can be estimated using near audio signal 225 according to the following formula. Assume that the near audio data 225 is used to estimate a source calibration signal 172 ($A^s$, $b^s$), by minimizing the EM (expectation maximization) Auxiliary function:

$$Q(A^s, b^s) = \sum_g \gamma_g^{ct} (\langle x \rangle_g^{ct} - (A^s \mu_g + b^s))^T \sum_g^{-1} (\langle x \rangle_g^{ct} - (A^s \mu_g + b^s))$$

where $\mu_g$ is voice interpreting data 175 (an HMM mean of Gaussian g in this example), $$\langle x \rangle_g^{ct} = \frac{1}{\gamma_g^{ct}} \sum_t \gamma_g^{ct}(t) x_t^{ct}, \gamma_g^{ct} = \sum_t \gamma_g^{ct}(t),$$

and $\gamma_g^{ct}(t)$ is the posterior probability that feature vector $\{x_t^{ct}\}$ was produced by Gaussian g, and t varies over all frame indices of the near audio signal 225. See M. J. F. Gales, and P. C. Woodland, Mean and variance adaptation within the MLLR framework, Computer Speech & Language, Volume 10, Issue 4, October 1996, Pages 249-264. The EM Auxiliary function is minimized to determine the values of $A^S$, $B^S$ that define source calibration signal 172.

The environment calibration signal 170 can be estimated using far-field audio signal 125 according to the following formula, with the far-field audio signal 125 and near audio signal 225 having first been aligned. If the far-field audio signal 125 and near audio signal 225 are not aligned, then it may be desirable to compensate for a time delay. For the far-field microphone data $\{x_t^{ff}\}$, assume that the posterior probabilities $\gamma_g^{ct}$ from the near audio signal 225 are used to define an auxiliary function:

$$Q(A^e, b^e) = \sum_g \gamma_g^{ct} (\langle x^{ff} \rangle_g^{ct} - \hat{\mu}_g)^T \sum_g^{-1} (\langle x^{ff} \rangle_g^{ct} - \hat{\mu}_g)$$

where $\hat{\mu}_g = A^e \hat{\mu}_g^s + b^e = A^e (A^s \mu_g + b^s) + b^e$. In other words, the speaker-independent HMM means $\mu_g$ (voice interpreting data 175) are first transformed to $\hat{\mu}_g^s = A^s \mu_g + b^s$ using source calibration signal 172 ($A^S$, $B^S$), and the new environment transforms ($A^e$, $b^e$) are estimated keeping ($A^s$, $b^s$) fixed. $\langle x^{ff} \rangle_g^{ct}$ is defined from $\gamma_g^{ct}$ and $\{x_t^{ff}\}$ using the formula:

$$\langle x^{ff} \rangle_g^{ct} = \frac{1}{\gamma_g^{ct}} \sum_t \gamma_g^{ct}(t) x_t^{ff}.$$

In other words, the posterior probabilities from near audio signal 225 are used to compute environment calibration signal 170. In this way, the dependence on speaker is avoided in the environment calibration signal 170 ($A^e$, $b^e$), and these capture only the effect of the environment (room reverberation and stationary noises). Environment calibration signal 170 ($A^e$, $b^e$) may then be used to adapt the acoustic model 175 only to the operating environment 100 and while maintaining their speaker-independence.

The Constrained MLLR transform can be calculated according to the following formula. In the Constrained MLLR transform, the means and covariance matrices of the Gaussians of an HMM are transformed in a constrained manner, and this is equivalent to an affine transformation of the feature vectors: x̂=Ax+b. See M. J. F. Gales, Maximum Likelihood Linear Transformations for HMM-Based Speech Recognition, Computer Speech and Language, Vol. 12, pp 75-98, 1998. In this case, the EM auxiliary function to be minimized is:

$$Q(A, b) = \sum_g \sum_t \gamma_g(t) \left[ -\log(|A|^2) + (\hat{x}_t - \mu_g)^T \sum_g^{-1} (\hat{x}_t - \mu_g) \right].$$

In this case too, the overall feature transform to the speech data from the new environment ($\hat{x}=Ax_t+b$), is a combination of source calibration signal 172 and environment calibration signal 170: $\hat{x}_t = A^e x_t^s + b^e = A^e(A^s x_t + b^s) + b^e$. Source calibration signal 172 ($A^s$, $b^s$) is first estimated on the close-talking speech features $\{x_t^{ct}\}$ using the auxiliary function:

$$Q(A^s, b^s) = \sum_g \sum_t \gamma_t^{ct}(t) \left[ -\log(|A^s|^2) + (A^s x_t^{ct} + b^s - \mu_g)^T \sum_g^{-1} (A^s x_t^{ct} + b^s - \mu_g) \right].$$

The environment calibration signal 170 ($A^e$, $b^e$) is estimated on top of the source calibration signal 172 ($A^s$, $b^s$) using the auxiliary function:

$$Q(A^e, b^e) = \sum_g \sum_t \gamma_t^{ct}(t) \left[ -\log(|A^e|^2) + \left( A^e(A^s x_t^{ff} + b^s) + b^e - \mu_g \right)^T \sum_g^{-1} \left( A^e(A^s x_t^{ff} + b^s) + b^e - \mu_g \right) \right].$$

In Constrained MLLR, source calibration signal 172 ($A^s$, $b^s$) and environment calibration signal 170 ($A^e$, $b^e$) are transforms applied to features from a particular operator 110 and environment 100, in order to match acoustic model 175. Therefore, Constrained MLLR calibration signals perform approximately the inverse operations of the Mean MLLR calibration signals—which capture the operations that cause the speaker and environment variability in the feature vectors.

The order of multiplication of the source calibration signal 172 and environment calibration signal 170 can be varied during the estimation of the environment calibration signal 170 ($A^e$, $b^e$). i.e., the overall adaptation to environment 100 and operator 110 may be formulated as ($A^s$, $b^s$) followed by ($A^e$, $b^e$) as above, or alternatively as ($A^e$, $b^e$) followed by ($A^s$, $b^s$). The order that works best may depend on the operator 110 and/or environment 100.

Figure 8:
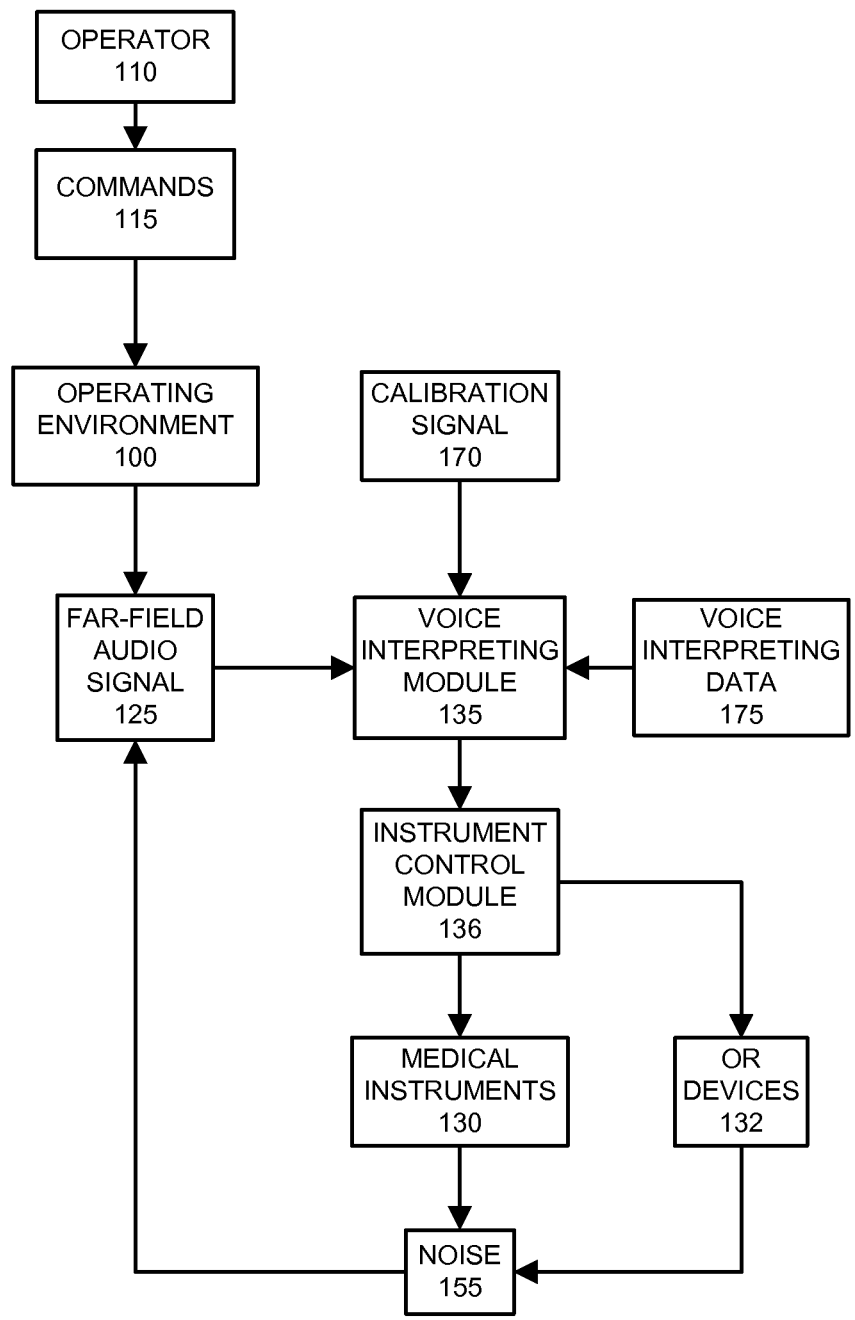
FIG. 8 is a block diagram of one embodiment of the voice controlled medical system in normal operation.

FIG. 8 shows one embodiment of a voice-controlled medical system 105 during normal operation, such as during a surgical procedure. Voice interpreting module 135 uses calibration 170 and voice interpreting data 175 to interpret far-field audio signal 125. Far-field audio signal 125 comprises commands 115 from operator 110 that have been distorted by operating environment 100. Far-field audio signal 125 also comprises noise 155, such as from medical instruments 130. Voice interpreting module 135 interprets far-field audio signal 125 by using calibration signal 170 to compensate for distortion and noise 155 from far-field audio signal in order to interpret commands 115. Once commands 115 are interpreted, voice interpretation module 135 instructs instrument control module 136 to execute commands 115 by sending instructions to medical instruments 130 and OR devices 132. As a result of this arrangement, operator 110 can control medical instruments 130 and OR devices 132 during a medical procedure using voice commands 115. The performance of voice interpreting module 135 in terms of its ability to interpret commands 115 will be improved because calibration signal 170 was developed using the system shown in FIG. 6 or 7.

Although the invention has been described with reference to embodiments herein, those embodiments do not limit the scope of the invention. Modifications to those embodiments or different embodiments may fall within the scope of the invention. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A voice controlled medical system with improved speech recognition, comprising:
   at least one microphone in an operating environment;
   a sound generator generating an audio signal in the operating environment;
   a medical device;
   a controller in communication with said microphone, said sound generator, and said medical device, and that operates said medical device by executing audio commands received by said microphone; and
   a calibration signal indicative of distortion in the operating environment, said calibration signal generated by comparing the audio signal with a sound signal received by said microphone;
   said controller using said calibration signal to interpret audio commands received by said microphone.

2. The voice controlled medical system of claim 1, wherein the audio signal comprises a recording of at least one human voice.

3. The voice controlled medical system of claim 2, wherein the audio signal comprises a recording of at least two human voices.

4. The voice controlled medical system of claim 1, wherein the audio signal comprises a set of sounds preselected to give the best performance for calibrating said controller.

5. The voice controlled medical system of claim 1, wherein said controller interprets audio commands using a hidden Markov model.

6. The voice controlled medical system of claim 1, wherein said at least one microphone is a microphone array.

7. A voice controlled medical system with improved speech recognition, comprising:
   a first microphone in an operating environment;
   a second microphone in the operating environment, said second microphone being nearer to a source of sound in the operating environment than said first microphone;
   a sound generator;
   a medical device;

a controller in communication with said first microphone and said medical device that operates said medical device by executing commands received by said first microphone; and a calibration signal generated by comparing a sound received by said first microphone and said second microphone, said sound generated by said sound generator;

said controller using said calibration signal to interpret audio commands received by said first microphone.

8. The voice controlled medical system of claim 7, wherein said calibration signal is generated in advance and stored for later use by said controller to operate said medical device.

9. The voice controlled medical system of claim 7, wherein said controller interprets audio commands using a hidden Markov model.

10. The voice controlled medical system of claim 7, wherein the source moves within the operating environment while the sound is received by said first microphone and said second microphone.

11. The voice controlled medical system of claim 7, further comprising:
 voice interpreting data; and
 a source calibration signal generated by comparing a sound received by said second microphone and said voice interpreting data;
 wherein said calibration signal is generated by comparing said source calibration signal to the sound received by said first microphone.

12. The voice controlled medical system of claim 7, wherein said calibration signal is generated using a Mean MLLR algorithm.

13. The voice controlled medical system of claim 7, wherein said calibration signal is generated using a Constrained MLLR algorithm.

14. A method of calibrating a speech recognition system in a voice controlled medical system, comprising:
 (a) playing an audio sample in an operating environment with a sound generator;
 (b) recording the audio sample using at least one microphone in an operating environment;
 (c) comparing the audio sample to the recording by the microphone;
 (d) generating a calibration signal based on the comparison performed in step (c); and
 (e) using said calibration signal to improve speech recognition for operating a medical device.

15. The method of claim 14, wherein the audio sample comprises a recording of at least one human voice.

16. The method of claim 15, wherein the audio sample comprises a recording of at least two human voices.

17. The method of claim 14, wherein the audio sample comprises a set of sounds pre-selected to give the best performance for calibrating the speech recognition system.

18. The method of claim 14, wherein the at least one microphone is a microphone array.

19. A method of calibrating a speech recognition system in a voice controlled medical system, comprising:
 (a) recording a sound in an operating environment using a first microphone and a second microphone nearer to a source of the sound than the first microphone, the sound generated by a sound generator;
 (c) comparing the recording by the first microphone and the second microphone; and
 (d) generating a calibration signal based on the comparison performed in step (c);
 wherein said calibration signal is generated in advance and stored for later use by a controller to operate a medical device.

20. The method of claim 19, further comprising:
 (e) moving the source of the sound within the operating environment during step (a).

21. The method of claim 19, wherein step (c) comprises generating a source calibration signal by comparing the recording by the second microphone to voice interpreting data, and comparing the source calibration signal to the recording by the first microphone; and
 wherein step (d) comprises generating a calibration signal based on the comparison between the source calibration signal and the recording by the first microphone.

22. The method of claim 19, wherein the calibration signal is generated using a Mean MLLR algorithm.

23. The method of claim 19, wherein the calibration signal is generated using a Constrained MLLR algorithm.

* * * * *